United States Patent
McLauchlin

(10) Patent No.: US 6,754,672 B1
(45) Date of Patent: Jun. 22, 2004

(54) SYSTEM AND METHOD FOR EFFICIENT INTEGRATION OF GOVERNMENT ADMINISTRATIVE AND PROGRAM SYSTEMS

(75) Inventor: Andrew William McLauchlin, Reston, VA (US)

(73) Assignee: American Management Systems, Inc., Fairfax, VA (US)

( * ) Notice: Subject to any disclaimer, the term of this patent is extended or adjusted under 35 U.S.C. 154(b) by 272 days.

(21) Appl. No.: 09/691,058

(22) Filed: Oct. 19, 2000

Related U.S. Application Data

(60) Provisional application No. 60/230,938, filed on Sep. 13, 2000.

(51) Int. Cl.[7] .............................................. G06F 17/30
(52) U.S. Cl. ........................................ 707/104; 707/10
(58) Field of Search ........................ 707/104, 10, 100, 707/102, 101, 103, 8; 709/316, 328, 200

(56) References Cited

U.S. PATENT DOCUMENTS

| | | | |
|---|---|---|---|
| 5,832,483 A | * 11/1998 | Barker | 707/8 |
| 5,970,490 A | 10/1999 | Morgenstern | 707/10 |
| 6,182,158 B1 | * 1/2001 | Kougiouris et al. | 709/328 |
| 6,349,343 B1 | * 2/2002 | Foody et al. | 709/316 |
| 6,393,456 B1 | * 5/2002 | Ambler et al. | 709/200 |
| 6,484,177 B1 | * 11/2002 | Van Huben et al. | 707/10 |
| 6,504,847 B1 | * 1/2003 | Horlander | 370/431 |

FOREIGN PATENT DOCUMENTS

WO     WO 00/29924     5/2000

OTHER PUBLICATIONS

JD Edwards tweaks its Oneworld Web ERP suite. Adshead, Anthony. Computer Weekly, Oct. 12, 2000, pp. 1–2.

A New Spin on EAI. Radding, Alan. Information Week. Oct. 9, 2000, pp. 1–7.

WF–XML and Interoperability. Spitzer, Tom. Web Techiques. Aug. 2000 v5 i8 pp. 1–8.

Biztalk Server makes EAI delivery easier. Agnus, Jeff. Information Week, Oct. 16, 2000, pp. 1–5.

Linthicum, David S., *Integrate Enterprise Applications with XML*, EBusiness Advisor, May 2000, vol. 18, i.5, p. 16.

King, Nelson, *EAI Directions*, Intelligent Enterprise, Mar. 1, 2000, vol. 3, i.4, p. 40.

Davydov, Mark M., *Catching te Next Wave of EAI Evolution*, Intelligent Enterprise, Apr. 10, 2000, vol. 3, i.6, p. S10.

*Easing EAI with XML*, ENT, Jun. 23, 1999, vol. 4, i.12, p. 16.

Donnelly, Brian, *Enterprise Application Integration*, Enterprise System Journal, May 1999, vol. 14, i.5, p. 80–81.

Radding Alan, A *New Approach to Integration–E–commerce Requires Companies to Integrate Processes at Many Levels with Multiple Partners*, Information Week, Aug. 28, 2000, p. 91.

\* cited by examiner

Primary Examiner—Sanjiv Shah
(74) Attorney, Agent, or Firm—Staas & Halsey LLP

(57) ABSTRACT

A system and method includes an interoperability engine dynamically generating and updating an application database, a web-based portal in a computer communications network, and a baseline data schema from at least one of a data source and a supplemental data source comprising self-describing documents, and enabling interoperability among application systems. The application database dynamically generates a reporting database. The web-based portal provides access to the application systems via the application database and the reporting database. The self-describing documents may be hosted. An integration unit maps the application systems to the baseline data schema and facilitates transmission and messaging between the baseline data schema and the application systems.

52 Claims, 4 Drawing Sheets

SYSTEM AND METHOD FOR EFFICIENT INTEGRATION OF GOVERNMENT ADMINISTRATIVE AND PROGRAM SYSTEMS

CROSS-REFERENCE TO RELATED APPLICATION

This application is based upon and claims priority of U.S. Provisional Application No. 60/230,938 filed on Sep. 13, 2000, the contents being incorporated herein by reference.

BACKGROUND OF THE INVENTION

1. Field of the Invention

The present invention is directed to a system designed to assist federal government organizations in facilitating the integration and sharing of core administrative and program data among disparate but inter-related application systems via a web-based portal and a back-end interoperability engine.

2. Description of the Related Art

Federal organizations perform their operations using a fragmented set of computer systems. Each computer system associated with a particular federal organization addresses specific administrative needs, such as financial management, procurement, property management, asset sales, and grants management. Each computer system may further support program specific activities specific to the federal organization's mission, for example, environmental permitting, patent application processing, or managing customer relationship for social services. The federal organization may build its computer system in-house, purchase commercial-off-the-shelf products vendors, or implement a system developed by other federal organizations (e.g., the National Institutes of Health's contractor past performance system). In addition, the federal organization may desire or be required to use external publicly accessible systems such as FedBizOpps (formerly known as the Electronic Posting System), the Central Contractor Registration ("CCR"), the Federal Procurement Data System ("FPDS"), or the Federal Acquisition Management Information System (proposed to replace FPDS).

Each system provides value to the corresponding federal organization in automating the individual processes and functions for which they are designed. However, the functions of these systems often overlap, or need to interoperate. Consider the simple example of buying a desk. A procurement system generates the purchase order, but the procurement process requires interoperability with several other systems. For instance, the purchasing agent may desire to post solicitation information to FedBizOpps to solicit bids. Further, as part of the procurement decision process, the purchasing agent is required to consider the past performance of potential vendors, for example, by accessing past performance systems such as the NIH past performance system. The purchasing agent may require additional detailed vendor data, which may be stored in a CCR system. Further, before an order is finalized, the organization's financial system needs to be polled to ensure that funds are available in the budget for the purchase and to obligate money for the ensuing payment. The purchasing agent may also need to report order data to FPDS. A property manager may also want to track the newly purchased item as a fixed asset in a property management system.

To date, federal organizations have had limited options to achieve system integration. The federal organizations may build individual interfaces between two systems to enable those two systems to communicate and then repeat the process for other systems. However, this approach may result in a confusing network of related but separately developed interfaces that pose a high risk of being out of synch. Some federal organizations resort to re-keying the data into each system; however, this approach is labor intensive and repetitive.

In the late 1990s, Enterprise Resource Planning ("ERP") systems were implemented in an attempt to solve interoperability problems among administrative systems in federal organizations by providing a single application that performs a variety of administrative functions, ranging from human resource management to financial management and procurement. However, the ERP system posed its own set of problems. For instance, switching to the ERP system required organizations to replace legacy applications with a new system and encumbered major system implementation expenses and management issues.

Additionally, the ERP system capabilities in specific functions, such as procurement, often fell short of robust functionality offered by best-of-breed products that were designed specifically to support those functions, thereby forcing organizations to choose between achieving a minimum level of administrative integration at the expense of deep functional support. Furthermore, it is difficult for any single software application system to anticipate and support all of the federal organization's potential programmatic needs, as well as, administrative needs. Even though the ERP system may meet some needs, it still requires a network of interfaces to other applications within the organization (e.g., program support systems and administrative systems not covered by the ERP) and requires a network of interfaces to publicly owned applications such as CCR and FedBizOpps. Seamless integration and communication among the various application systems requires extensive infrastructure or middleware architecture.

Portal tools enable delivery of data to employees, customers and business partners via a web-based interface. Yet, the portal tools need underlying instructions regarding what data to share among business partners, and the rules within which that data should be shared (e.g., read only, not visible, editable, deletable).

Enterprise Application Integration ("EAI") products offer robust tools for such interoperability tasks as mapping one system to a defined data schema and sending messages from one system to another. EAI tools often provide out-of-the-box, "no coding" adapters that integrate widely used commercial off the shelf ("COTS") products. Which EAI tools provide a platform that can facilitate interoperability and out-of-the-box adapters may provide a good integration starting point, several factors exist that require an additional layer of interoperability automation. For example, in many cases, federal organizations have built their own custom systems for which no standard adapter schema for a COTS product exists.

Additionally, out-of-the-box adapters are typically designed and developed for lowest-common-denominator data integration needs and for corporate business processes, not for federal organizations. Although much can be leveraged from commercial adapters to create federal adapters, these adapters must be changed or rewritten to accommodate core federal requirements (e.g., verfying funds availability before a purchase order is finalized). A federal interoperability tool is needed that enables federal organizations to pull their disparate application systems together and to base the interoperability and integration on rules established as both government-wide and organization-wide policy.

SUMMARY OF THE INVENTION

It is an object of the present invention to provide for a system that allows internal government systems (e.g., program systems including customer relationship management, internal operations, and administrative systems including finance, procurement, property, asset sales, and grants) and external government systems (e.g., FedBizOpps, CCR, FPDS or the Federal Acquisition Management Information System) to communicate and exchange messages and allows an end user to access the plurality of disparate legacy, current, and emerging government application systems from a point of entry web-based portal in a computer communications network. Further, the present invention ensures that information is accessed and used only in authorized ways and maintains the integrity, availability, and/or confidentiality of the information.

It is an object of the present invention to provide for a system, a method, and a computer readable storage medium providing users of a federal organization administrative and program processes a single web-based system interface from which to conduct all business transactions and exchanges of information. In particular, a data source includes self-describing documents including data elements, definitions of data elements, data element contents, data element characteristics and business function interoperability rules for each data element in the application systems. An interoperability engine processes the definitions and the interoperability rules and provides interoperability among the application systems. A point of entry web-based portal connected to the back-end interoperability engine provides access to disparate federal application systems.

In accordance with another object of the present invention, a data source is regularly surveyed and the interoperability engine analyzes changes to the data source. The interoperability engine dynamically generates and/or updates a baseline data schema based on changes to the data source. The invention applies the baseline data schema in various ways to dynamically build and maintain a single point of access to and interoperability among multiple external, administrative and programmatic systems, as follows.

The interoperability engine dynamically updates an application database structure based on changes to the data source as defined in the baseline data schema. The interoperability engine dynamically updates the web-based portal interface based on the changes to the data source as defined in the baseline data schema. The interoperability engine dynamically updates system interoperability among multiple external, administrative, and programmatic systems based on changes to the data source as defined in the baseline data schema. An integration unit is associated with the baseline data schema to facilitate mapping and messaging of data among the external systems, administrative systems, programmatic systems, and the application database. The web portal provides access to the application database, which interoperates with the external, administrative, and programmatic systems via the integration unit based on rules defined by the baseline data schema.

In accordance with another object of the present invention, a system includes an interoperability engine dynamically generating a point of access, an application database, and a baseline data schema and enabling interoperability among application systems.

In accordance with another aspect of the present invention, a method including dynamically generating a point of access, an application database, and a baseline data schema, enabling interoperability among application systems using the baseline data schema, and providing access to the application systems via the point of access using the application database.

In accordance with a further object of the present invention, a computer readable storage medium controlling a computer and including dynamically generating a point of access, an application database, and a baseline data schema, enabling interoperability among application systems using the baseline data schema, and providing access to the application systems via the point of access using the application database.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
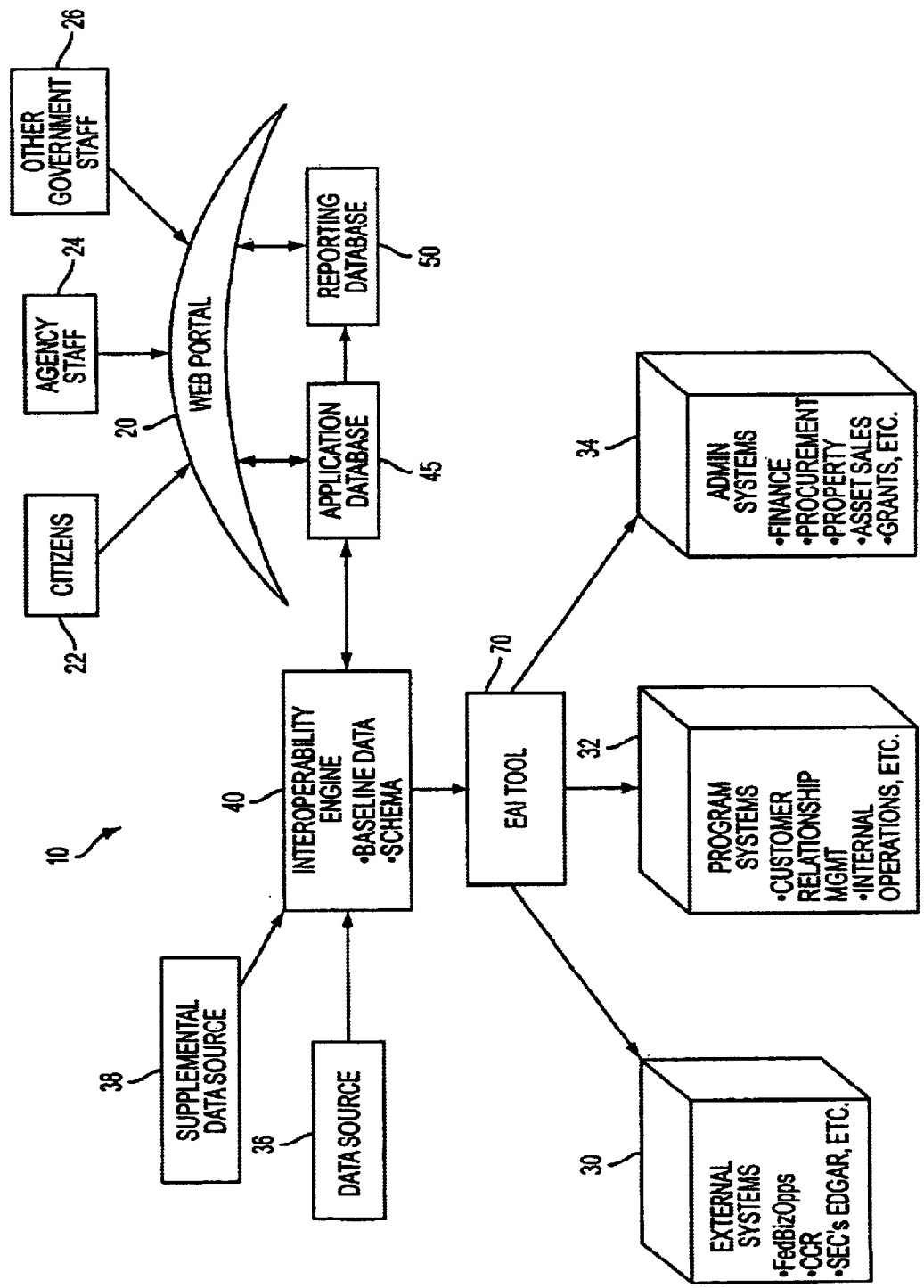
FIG. 1 is a diagram of a system architecture in accordance with the present invention.

FIG. 1 is a schematic diagram of an embodiment of a system 10 including a Web portal 20 allowing multiple users, such as citizens 22, agency staff 24, and other government staff 26 to access most current information from various application systems, such as federal government application systems (e.g., external systems 30, program systems 32, and adminisrative systems 34). These application systems may be of various types and use various languages and protocols, such as Java, XML, C++, Visual Basic, etc.

Connected to the Web portal 20 is a Web server (not shown) that delivers an HTML document, or "Web page," to a Web browser (not shown) when requested. These browsers take a document formatted in HTML, generate its visual display, and perform any associated processing. Internet communications are mainly based upon Hypertext transport protocol ("HTTP"), Common gateway interface ("CGI"), Internet inter ORB protocol ("IIOP"), and Java database connectivity ("JDBC"). HTTP is the main communication mechanism among web browsers and servers.

A data source 36 is provided including one or more self-describing documents. The self-describing documents of the data source 36 are, for example, XML documents based on document table definitions ("DTD") that define terms and fields of a score set of data elements for the external systems 30, program systems 32, and administrative systems 34 and their interrelationships. The DTD acts as a translator defining the terms and fields to be later used to communicate with the external systems 30, program systems 32, and administrative systems 34. Thus, the DTD in the self-describing documents of the data source 36 may include, for example, data elements, data element contents, data element characteristics, and data interoperability rules that may be necessary to facilitate communication and messaging among the external systems 30, program systems 32, and administrative systems 34.

In an exemplary embodiment, the data elements may include data labels such as quantity, price, unit, award date, and obligated amount. Data element characteristics include fields such as Required, Optional, Text, Numeric. Data interoperability rules include operation Tules of system 10. The system 10 operation rules include required edit checks among other data elements, for instance, cross-data edits currently specified in the FPDS Reporting Manual, instructions identifying, at a generic level, the data elements that a particular data source requires (e.g., labels such as Property, Finance, Procurement, Supplier, Citizen), and instructions identifying the different external systems 30, program systems 32, and administrative systems 34 that share data elements. The self-describing documents of the data source 36 may contain additional data definitions and data interoperability instructions as necessary to define the system 10 requirements and operating rules, for example, tags that specify the current date and version of the data source 36 and/or tags that specify the current date and version for each data element within the self-describing documents of the data source 36 (i.e., DTD).

A supplemental data source 38, for example, may be incorporated providing policies and best practices and also including one or more self-describing documents. Using the supplemental data source 38, federal organizations have the option to define organization-specific self-describing documents that add data element components to the system 10 beyond those defined by the data source 36. The federal organizations may provide modifications or updates to the data element components identified by the data source 36 as optional. These modifications would be incorporated into the self-describing documents of the supplemental data source 38 and would override the defining characteristics of the specific component contained in the data source 36. Further, organizations may add components (e.g., organization-specific data elements or interoperability requirements) in addition to the components already provided for in the data source 36.

The self-describing documents of the data source 36 and/or of the supplemental data source 38 include data elements, data element contents, data element characteristics, and data interoperability rules for each data element required by the federal organizations implementing system 10 such as those elements required by the external systems 30, program systems 32, and administrative systems 34. Further, the self-describing documents of the data source 36 and/or of the supplemental data source 38 may be hosted. For example, the self-describing documents of the data source 36 and/or of the supplemental data source 38 may be hosted at a site owned by a proprietary owner (e.g., American Management Systems, AMS), at a public site (e.g., the General Services Administration), or at an implementing organization site (e.g., Department of Transportation, Department of the Interior, or any other commercial organization).

An interoperability engine 40 provides interoperability between appreciation systems such as legacy, current, and emerging government external systems 30, program systems 32, and administrative systems 34. The interoperability engine 40 is a data extraction, transformation, and transportation tool developed using common programming language (e.g., Java, XML, C++, Visual Basic, etc.). The interoperability engine 40 may be a transaction server, an application server, a component server, or a business rule server. The basic abilities of the interoperability engine 40 include scalability, adaptability, recoverability, and manageability.

The interoperability engine 40 dynamically generates an interoperability baseline data schema based on the self-describing documents from the data source 36 and/or the supplemental data source 38. Specifically, the interoperability engine 40 generates in real time, in an automated manner and without human intervention, the baseline data schema. The baseline data schema is a computer medium, self-describing documents, or files, such as XML, which can be used for generating Web portals, generating databases, and defining adaptors used by EAI tools. In essence, the baseline data schema functions as a common denominator to leverage and enable interoperability among various systems.

These various systems may be any type of system that need to interoperate with other systems and may be in any given format. In an exemplary embodiment, the baseline data schema functions as a common denominator to leverage an EAI tool 70, to be later discussed, to communicate to external systems 30, program systems 32, and administrative systems 34. The data elements in the baseline data schema are mapped in a format that the EAI tool 70 or any other type of integration tool well known in the art can recognize. For instance, the EAI tool 70 may accept a common format of XML documents that the EAI tool 70 can import and can be used to map to the various external systems 30, program systems 32, and administrative systems 34. In one embodiment, the interoperability engine 40 includes the Web server. Alternatively, the Web server may stand separate from the interoperability engine 40 and connected to the Web portal 20.

The interoperability engine 40 farther dynamically generates an application database 45. In turn, the application database 45 dynamically generates a reporting database 50 (i.e., the application database 45 generates on the fly the reporting database 50). Once again, dynamic generation may be accomplished by generating in real time or in an automated manner without human intervention. The application database 45 and the reporting database 50 are database structures connected to the Web portal 20. The application database 45 and the reporting database 50 contain identical data elements as a baseline data schema of an interoperability engine 40, to be later described, in a structured design. The application database 45 provides the user with read/write access to the external systems 30, program systems 32, and administrative systems 34. The reporting database 50 is a data mart or a data warehouse that allows the user to access information from the external systems 30, program systems 32, and administrative systems 34, for example, in a read only format.

The interoperability engine 40 analyzes the self-describing documents received from the data source 36 and/or the supplemental data source 38, interprets the self-describing documents, and generates the baseline data schema. The interoperability engine 40 builds the Web portal 20 based on the baseline data schema. The interoperability engine 40 enables the user to access the external systems 30, program systems 32, and administrative systems 34 via, for example, the Web portal 20 or any other means using the application database 45 and the reporting database 50, and supports messaging and sharing of information among the external systems 30, program systems 32, and administrative systems 34. Thus, the interoperability engine 40 dynamically generates the application database 45, the reporting database 50 structure, and the Web portal 20 by applying, for instance, COTS database, OLAP, and Web portal tools well known in the art.

Once a user logs in, the Web portal 20 allows the user to access data information and/or navigate through the external systems 30, program systems 32, and administrative systems 34. Furthermore, in the event the user wishes to access a particular external system 30, program system 32, and administrative system 34, the external system 30, program system 32, and administrative system 34 is configured, for example, to perform a security clearance prior to allowing the user to access the information. As an alternative, the data source 36 and/or the supplemental data source 38 might be configured, for example, to incorporate security constraints in accordance with predefined security requirements from the external, administrative, and program systems. For example, source documents that define unclassified systems such as finance, procurement, or property, and that are hosted by a public site, may be posted with low levels of security. Whereas, source documents that define systems that support classified operations or that contain proprietary source definitions, would be posted with high levels of security.

In another embodiment, the interoperability engine 40 is programmed, for example, to monitor security clearance. The system 10 architecture might be implemented to ensure user security administration and validation key management on the network. The security clearance can be verified, for example, at the time the user attempts to access the particular external system 30, program system 32, or administrative system 34. Further, the system 10 can be implemented, for example, where in the event the user is allowed to access a particular external system 30, program system 32, or administrative system 34 but requires to access information from another external system 30, program system 32, and administrative system 34, the interoperability engine 40 may prompt the user, via the Web portal 20, that further security clearance is required to access the information.

This integration of the invention with internal and external systems enables all business partners both, inside and outside the implementing federal organization, to interact with each other and share data via the Web portal 20. Entries into the Web portal 20 trigger EAI-enabled sharing of data from the baseline data schema to the relevant internal and external systems. This interoperability enables users, from the Web portal 20, to interact with internal and external systems and perform business transactions (e.g., post requests for quotations, access established sources of vender data, post procurement synopsis and award notices).

Furthermore, the interoperability engine 40 may include, for instance, mechanisms to dynamically survey the information in the data source 36 and/or the supplemental data source 38 to determine if any changes have occurred within the data source 36 and/or the supplemental data source 38. For instance, the interoperability engine 40 would dynamically survey the tags in the self-describing documents of the data source 36 and/or of the supplemental data source 38 specifying the current date and version of the data source 36 and/or supplemental data source 38, and thereby trigger the dynamic system update, to be described in FIG. 3. In the alternative, the interoperability engine 40 would dynamically survey the tags in each data element in the self-describing documents of the data source 36 and/or of the supplemental data source 38 to determine if the current date and/or version have changed and thereby trigger the dynamic system update. The system 10 may also provide a mechanism to trigger a survey of the data source 36 and/or the supplemental data source 38 on demand. For example, the data source 36 and/or the supplemental data source 38 may have a master version number data element that the invention surveys, compares to the last version number, and determines whether a new version of the data source 36 and/or the supplemental data source 38 has been posted. In another embodiment, the interoperability engine 40 may trigger the survey to the data source 36 and/or the supplemental data source 38.

If the version has changed, the interoperability engine 40 dynamically initiates maintenance or update adjustments based on the data contained in the self-describing documents of the data source 36 and/or the supplemental data source 38. if the version has not changed, the interoperability engine 40 dynamically updates the application database 45, the reporting database 50, the baseline data schema, and the Web portal 20 to reflect the current version number along with current date and time as the last version survey conducted.

Figure 2:
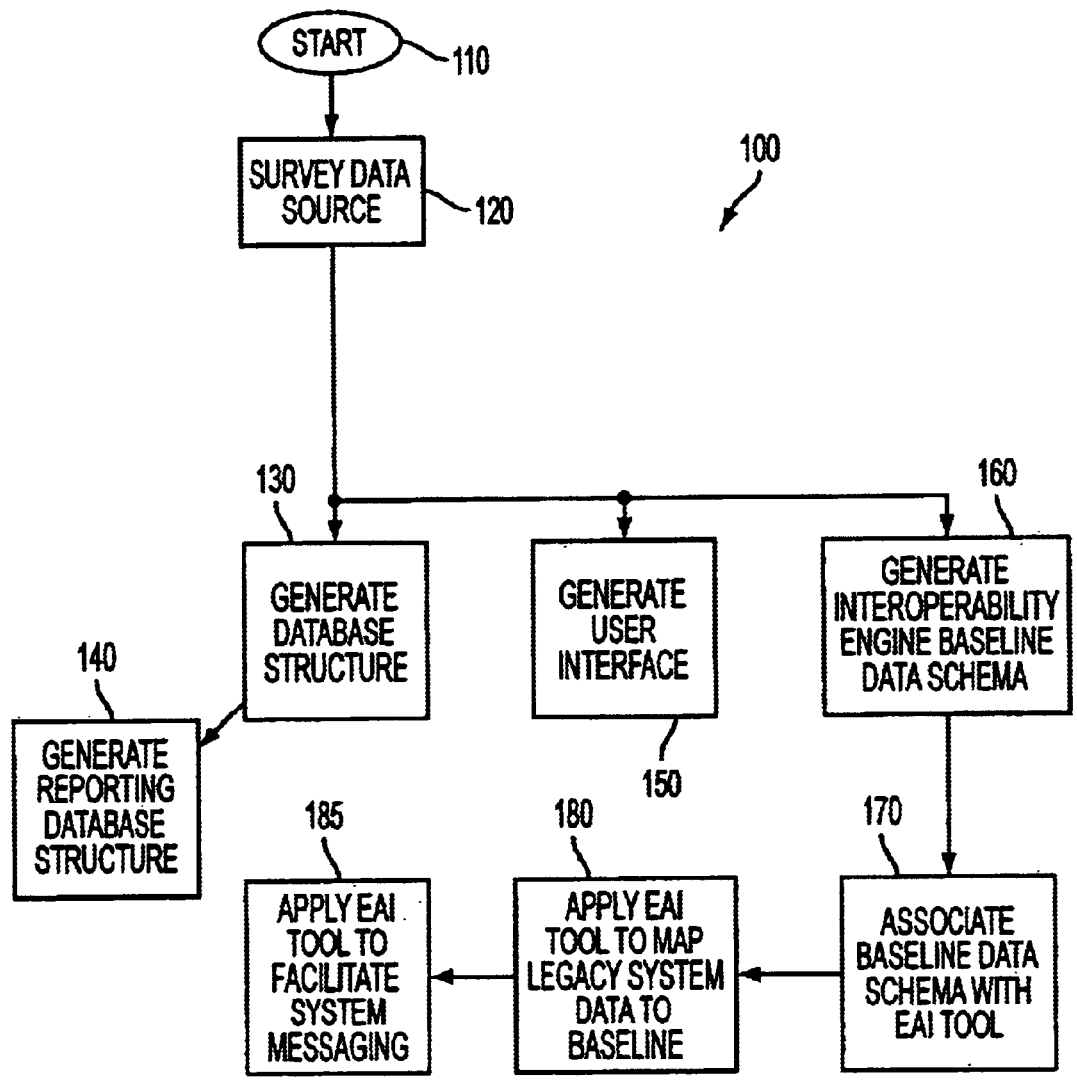
FIG. 2 is a diagram of a dynamic start-up process, in accordance with the present invention.

FIG. 2 is a diagram of a dynamic start-up process 100. At operation 110, memories are cleared, initial flag conditions are set, etc., as is well known in the art. From operation 110, process 100 proceeds to operation 120, where process 100 dynamically surveys and analyzes data elements, data element contents, data element characteristics, and data interoperability rules included in the data source 36 and/or the supplemental data source 38 self-describing documents. From operation 120, process 100 proceeds to operation 130, where process 100 dynamically generates the application database 45 structure. From operation 130, process 100 proceeds to operation 140, where process 100 dynamically generates the reporting database 50 structure. As previously described, the application database 45 allows the user to read/write information from and to the external systems 30, program systems 32, and administrative systems 34 via the Web portal 20 to the external systems 30, program systems 32, and administrative systems 34. The reporting database 50 allows the user to read information only from the external systems 30, program systems 32, and administrative systems 34 via the Web portal 20.

From operation 140, process 100 proceeds to operation 150, where process 100 dynamically generates the user interface Web portal 20. Specifically, process 100 creates a Web portal 20 corresponding to each external systems 30, program systems 32, and administrative systems 34 based on the information provided by either the proprietary host or public host in the self-describing documents of the data source 36 and/or of the supplemental data source 38. From operation 150, process 100 proceeds to operation 160, where process 100 dynamically generates the baseline data schema. Process 100 analyzes the information in the data source 36 and/or the supplemental data source 38, interprets the information, and maps the information into the baseline data schema.

From operation 160, process 100 proceeds to operation 170, where process 100 associates the baseline data schema with the EAI tool 70. The baseline data schema serves as a common denominator to leverage the EAI tool 70, to enable the external systems 30, program systems 32, and administrative systems 34 to share information, and to allow a user to access information from the external systems 30, program systems 32, and administrative systems 34. From operation 170, process 100 proceeds to operation 180, where the integration unit is applied to map the external systems 30, the program systems 32, and the administrative systems 34 to the baseline data schema. From operation 180, process 100 proceeds to operation 185, where the EAI tool 70 is applied facilitating transmission and messaging between the baseline data schema and the external systems 30, the program systems 32, and the administrative systems 34. Furthermore, in the embodiment described herein and illustrated in FIG. 2, process 100 performs operations 130, 140, 150, and 160 sequentially. In the alternative, an ordinary person skilled in the art can appreciate that process 100 may perform operations 130, 140, 150, and 160 concurrently. Further, an ordinary person skilled in the art can appreciate that process 100 may be triggered on demand.

This integration of the invention with administrative and programmatic systems enables all business partners within the federal organizations to interact with each other and share data via the Web portal 20. As a result, any data entered via the portal is stored in the application database 45. Entries into the application database 45 trigger the EAI tool 70 to allow data sharing from the application database 45 to the relevant administrative and programmatic systems. This interoperability enables users via the Web portal 20 to interact with stovepipe external systems 30, program systems 32, and administrative systems 34 and share data (e.g., update related records, trigger related transactions, access/validate/verify historical related data on demand for improved decision making). Thus, once process 100 migrates all the information contained in the external systems 30, the program systems 32, and the administrative systems 34 to the application database 45, process 100 provides an implementing organization, the option to shut down the systems 30, 32, 34.

Once process 100 is completed, the application database 45, the reporting database 50, the user interface, and the baseline data schema are dynamically updated by regularly polling the data source 36 and/or the supplemental data source 38 via a system update process 200. In one embodiment, the interoperability engine 40 regularly triggers process 200 to survey for changes in the data source 36 and/or the supplemental data source 38. In an alternative embodiment, the intelligence to automatically survey the data source 36 and/or the supplemental data source 38 is built in the self-describing documents. In another alternative embodiment, process 200 is triggered to survey the data source 36 and/or the supplemental data source 38, on demand, through the proprietary host, the public host, the implementing organization host or the Web portal 20. For illustrative purposes, process 200, hereinafter described, is triggered by the interoperability engine 40.

Figure 3:
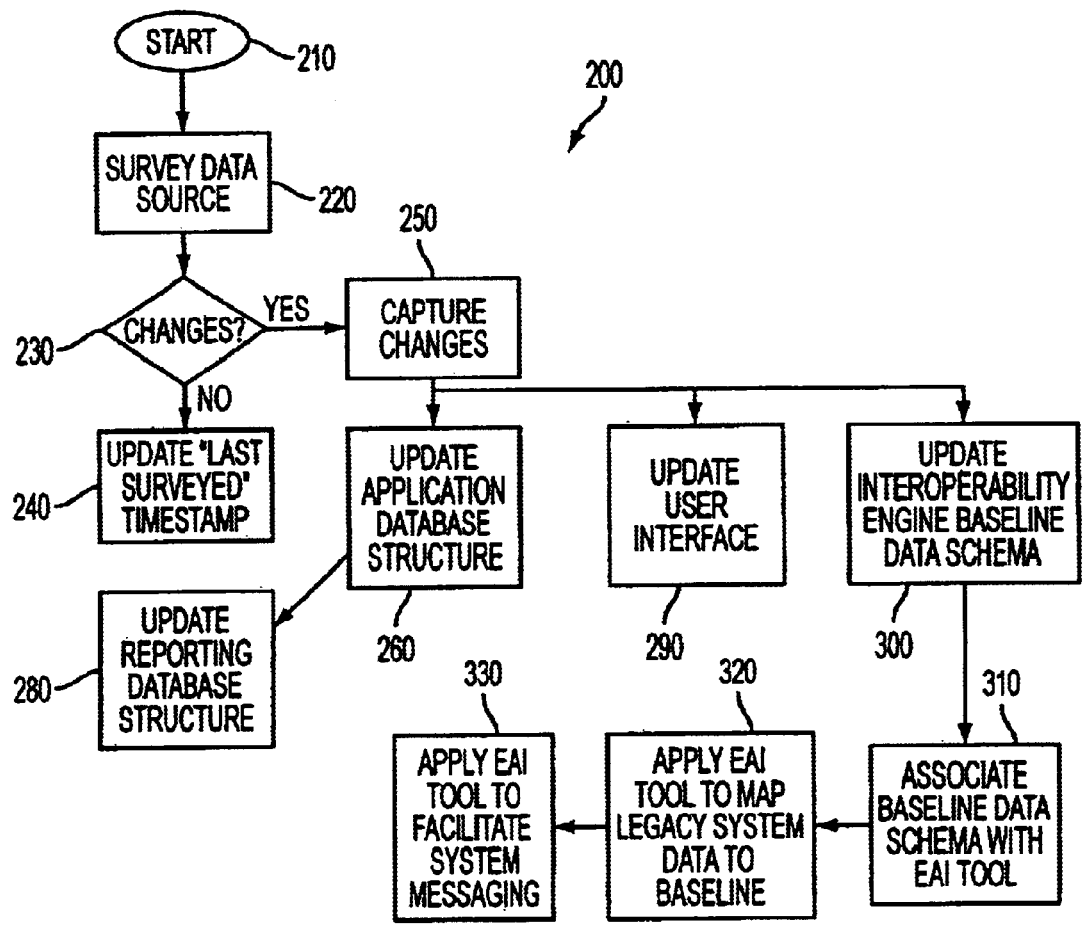
FIG. 3 is a diagram of a dynamic system update, in accordance with the present invention.

For new or changed components, the dynamic system update process 200 illustrated in FIG. 3 is performed to update data element, data element contents, data element characteristics, and data interoperability rules for each data element flagged as being new or changed. FIG. 3 illustrates a dynamic system update where process 200 begins at operation 210 where memories are cleared, initial flag conditions are set, etc., as is well known in the art. From operation 210, process 200 proceeds to operation 220, where process 200 dynamically scans the data source 36 and/or the supplemental data source 38 self-describing documents for data-specific flags that identify new or changed data source 36 and/or the supplemental data source 38 components. A new or changed component may constitute a variety of distinct adjustments to the self-describing documents of the data source 36 and/or of the supplemental data source 38, such as, a new data element or a revised edit check for an existing data element. In an alternative embodiment, process 200 surveys and compares a master version number with a last version number and determines whether a new version of the data source 36 and/or the supplemental data source 38 exists.

From operation 220, process 200 proceeds to operation 230, where a determination is made whether changes occurred in the self-describing documents of the data source 36 and/or of the supplemental data source 38. In the event that no changes are made to the self-describing documents of the data source 36 and/or of the supplemental data source 38, process 200 proceeds to operation 240. At operation 240, process 200 updates the time the survey on the self-describing documents of the data source 36 and/or of the supplemental data source 38 is performed. However, if at operation 230, changes are made to the self-describing documents of the data source 36 and/or of the supplemental data source 38, process 200 proceeds to operation 250. At operation 250, process 200 dynamically updates changes to the characteristics of the data element and updates changes to the associated relationships among data elements within the self-describing documents.

From operation 250, process 200 proceeds to operation 260, where process 200 processes the changes to the data elements, data element contents, data element characteristics, and data interoperability rules and updates therefrom the application database 45. Similarly, at operation 280, process 200 dynamically updates the reporting database 50 structure. From operation 280, process 200 proceeds to operation 290, where process 200 dynamically updates the Web portal 20. Specifically, process 200 updates (e.g., read, edit, delete) data elements viewed from the web-based portal.

From operation 290, process 200 proceeds to operation 300, where process 200 surveys and analyzes the updated data source and/or supplemental data source self-describing documents of the data source 36 and/or of the supplemental data source 38 and dynamically updates the baseline data schema. Process 200 analyzes the updated information in the data source 36 and/or the supplemental data source 38, interprets the information and maps the information into a baseline data schema.

From operation 300, process 200 proceeds to operation 310, where process 200 associates the baseline data schema with the EAI tool 70. Specifically, process 200 dynamically updates the data elements, data element contents, data element characteristics, and data interoperability rules in the baseline data schema thereby dynamically updating the baseline data schema to leverage the integration unit to communicate to the external systems 30, the program systems 32, and the administrative systems 34. From operation 310, process 200 proceeds to operation 320, where the integration unit is applied to map the application system data to the updated baseline data schema. From operation 320, process 200 proceeds to operation 330, where the integration unit is applied facilitating messaging among the external systems 30, program systems 32, administrative systems 34, and the application database 45.

Thus, process 200 dynamically updates the baseline data schema and the application database 45 to identify the identifying version information (e.g., version number, date) of the surveyed and analyzed data source 36 and/or the supplemental data source 38. This version information is constantly displayed to the user via the web interface (e.g., Certified current through FAC 2000-1 dated <date>. Last surveyed: <date and time last surveyed>).

Thus, process 200 allows efficient and effective upgrade process for government external systems 30, program systems 32, and administrative systems 34. Process 200 provides dynamic migration from any given legacy system to contemporary technologies, without interruption in functionality or data access. Furthermore, in the embodiment described herein and illustrated in FIG. 3, process 200 performs operations 260, 280, 290, and 300 sequentially. In the alternative, an ordinary person skilled in the art can appreciate that process 200 may perform operations 260, 280, 290, and 300 concurrently. In the alternative, process 200 may be triggered on demand.

Because the interoperability engine 40 dynamically updates the changes to the self-describing documents of the data source 36 and/or supplemental data source 38, the baseline data schema, the Web portal 20, the application database 45, and the reporting database 50, the system update process 200 is effective and efficient. However, in the alternative, the interoperability engine 40 may also update the entire the self-describing documents of the data source 36 and/or supplemental data source 38, the baseline data schema, the Web portal 20, the application database 45, and the reporting database 50. Further, the system update process 200 allows the users accessing the external systems 30, the program systems 32, and the administrative systems 34 information via the Web portal 20, to have accurate and most up-to-date information.

Figure 4:
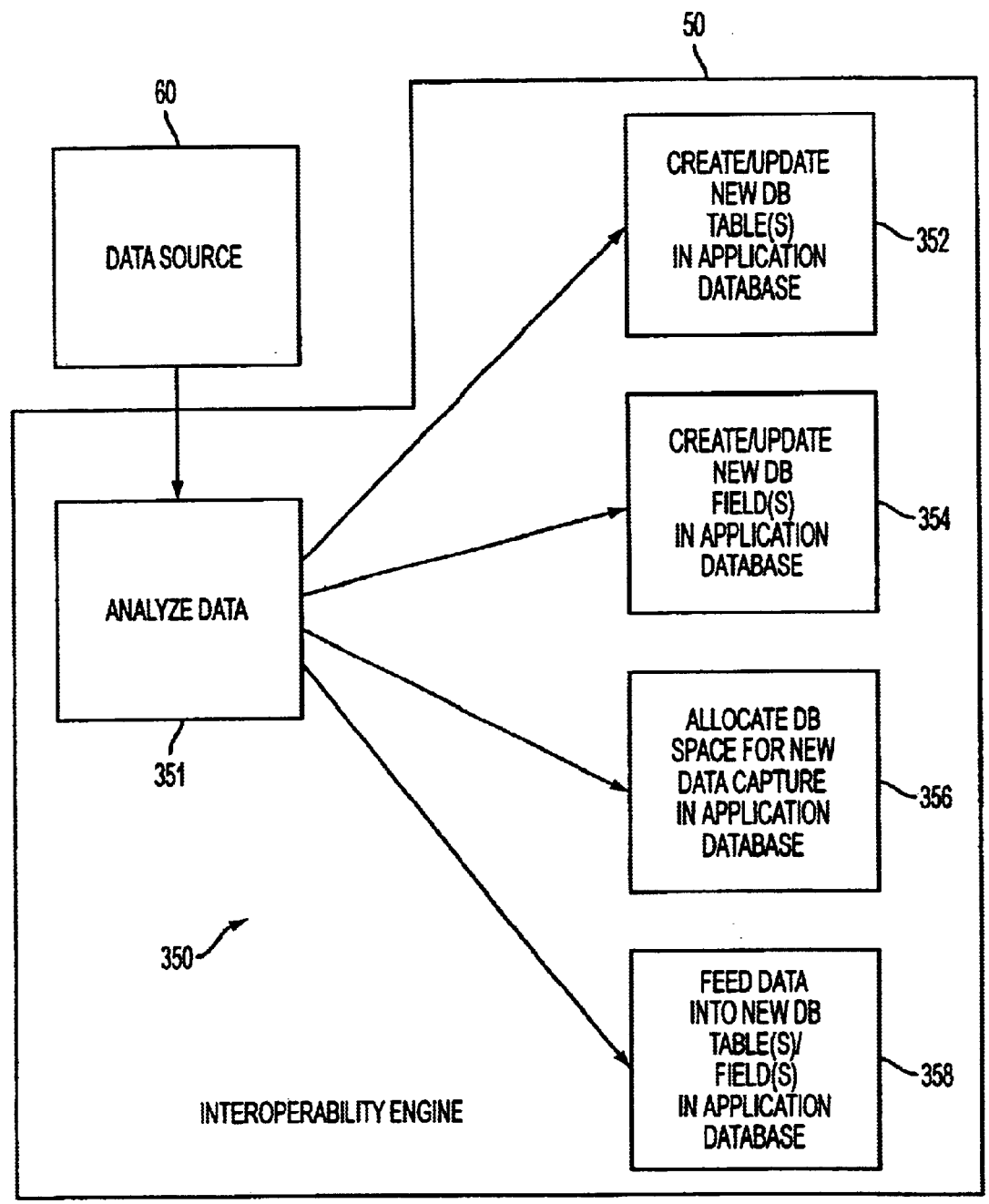
FIG. 4 is a diagram of a process performed by an interoperability engine, in accordance with the present invention.

FIG. 4 is a diagram of process 350 performed by the interoperability engine 40. At operation 351, process 350 receives data elements, data element contents, data element characteristics, and data interoperability rules from the data source 36 and/or the supplemental data source 38. From operation 351, process 350 proceeds to operation 352, where a new table(s) are either created or updated in the application database 45 depending on whether the dynamic start-up process 100 is performed or if the dynamic system update process 200 is performed. From operation 352, process 350 proceeds to operation 354, where new database field(s) are created/updated in the application database 45 and, at operation 356, process 350 allocates space for new data elements captured in the application database 45. From operation 356, process 350 proceeds to operation 358, where any data element content that resides in the data source 36 and/or supplemental data source 38 is fed into the space allocated in the new table(s)/field(s) in the application database 45.

In an alternative embodiment, any organization in the public or private sector could use the invention to achieve interoperability among multiple, disparate external systems 30, program systems 32, and administrative systems 34 and provide a single web-based interface for all business partners. They may control the system design by either accepting a publicly held standard self-describing data source 36 and/or the supplemental data source 38, or by building their own privately held self-describing data source 36 and/or the supplemental data source 38. The invention could also include the development of proprietary AMS self-describing data structures that can be sold to members of specific industries as an "out-of-the-box" data source 36 and/or the supplemental data source 38 for implementing the invention. Furthermore, an ordinary person skilled in the art will appreciate that interoperability may be achieved using multiple data sources and/or supplemental data sources, multiple application and reporting databases, and multiple baseline data schema, or multiple Web portals.

The above embodiments are described as using various languages and protocols, such as Java, XML, C++, Visual Basic, etc. However, the present invention is not limited to these languages and protocols, and others can be used.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system, comprising:
   an interoperability engine dynamically generating a web based user interface, providing access to application systems, and a baseline data schema and enabling interoperability among the application systems, wherein the baseline data schema is a common denominator data structure among the application systems, and the application systems comprise at least one of an external system, a program system, and an administrative system.

2. The system as recited in claim 1, wherein the interoperability engine further dynamically generates an application database.

3. The system as recited in claim 2, wherein the application database dynamically generates a reporting database.

4. The system as recited in claim 1, wherein the interoperability engine generates the baseline data schema from at least one of a data source and a supplemental data source.

5. The system as recited in claim 1, further comprising an integration unit mapping the application systems to the baseline data schema and facilitating transmission and messaging between the baseline data schema and the application systems.

6. A system, comprising:
   an interoperability engine dynamically generating a web based user interface providing access to application systems, an application database, and a baseline data schema from at least one of a data source and a supplemental data source and enabling interoperability among the application systems, wherein the supplemental data source adds, deletes, modifies, and/or updates data element components to the system beyond the data elements components defined by the data source, and the application systems comprise at least one of an external system, a program system, and an administrative system.

7. The systems as recited in claim 6, wherein the interoperability engine further dynamically updates the user interface, the application database, and the baseline data schema.

8. The system as recited in claim 6, wherein the at least one of the data source and the supplemental database comprise self-describing documents comprising data elements, data element contents, data element characteristics, and data interoperability rules.

9. The system as recited in claim 8, wherein the self-describing documents are hosted at one or more of a proprietary owner host site, a public host site, and an implementing organization host site comprising predetermined security restrictions.

10. The system as recited in claim 8, wherein the interoperability engine receives the self-describing documents to dynamically generate the baseline data schema.

11. The system as recited in claim 8, wherein the interoperability engine receives at least one data element component from the self-describing documents of the supplemental data source overriding defining characteristics of the at least one data element component in the data source.

12. The system as recited in claim 6, wherein the application database dynamically generates a reporting database.

13. The system as recited in claim 6, further comprising an integration unit mapping the application systems to the baseline data schema and facilitating transmission and messaging between the baseline data schema and the application systems.

14. A system, comprising:
an interoperability engine dynamically generating
an application database,
a web based user interface providing access to application systems via the application database,
a baseline data schema from at least one of a data source and a supplemental data source comprising self-describing documents, wherein
the supplemental data source adds, deletes, modifies, and/or updates data element components to the system beyond the data elements components defined by the data source,
the self-describing documents comprise data elements, data element contents, data element characteristics, and data interoperability rules,
the interoperability engine enables interoperability among the application systems, and
the application systems comprise at least one of an external system, a Program system, and an administrative system.

15. The systems as recited in claim 14, wherein the interoperability engine further dynamically updates the user interface, the application database, and the baseline data schema.

16. The system as recited in claim 14, wherein the self-describing documents are hosted at one or more of a proprietary owner host site, a public host site, and an implementing organization host site comprising predetermined security restrictions.

17. The system as recited in claim 14, wherein the application database dynamically generates a reporting database.

18. A system, comprising:
an interoperability engine dynamically generating
an application database,
a web based user interface in a computer communications network providing access to application systems via the application database,
a baseline data schema from at least one of a data source and a supplemental data source comprising self-describing documents, wherein
the supplemental data source adds, deletes, modifies, and/or updates data element components to the system beyond the data elements components defined by the data source,
the self-describing documents comprise data elements, data element contents, data element characteristics, and data interoperability rules,
the interoperability engine enables interoperability among the application systems, and
the application systems comprise at least one of an external system, a program system, and an administrative system; and
an integration unit mapping the application systems to the baseline data schema and facilitating transmission and messaging between the baseline data schema and the application systems.

19. The systems as recited in claim 18, wherein the interoperability engine further dynamically updates the user interface, the application database, and the baseline data schema.

20. The system as recited in claim 18, wherein the self-describing documents are hosted at one or more of a proprietary owner host site, a public host site, and an implementing organization host site comprising predetermined security restrictions.

21. The system as recited in claim 18, wherein the application database allows read/write operations.

22. The system as recited in claim 18, wherein the reporting database allows read only operations.

23. A method, comprising:
dynamically generating a web based user interface, providing access to application systems, and a baseline data schema; and
enabling interoperability among the application systems, wherein the baseline data schema is a common denominator data structure among the application systems, and the application systems comprise at least one of an external system, a program system, and an administrative system.

24. The method as recited in claim 23, further comprising dynamically generating an application database.

25. The method as recited in claim 23, further comprising dynamically generating a reporting database.

26. The method as recited in claim 23, further comprising mapping the application systems to the baseline data schema and facilitating transmission and messaging between the baseline data schema and the application systems.

27. A method, comprising:
dynamically generating a web based user interface, an application database, and a baseline data schema;
enabling interoperability among application systems using the baseline data schema; and
providing access to the application systems via the user interface using the application database, wherein the baseline data schema is a common denominator data structure among the application systems, and the application systems comprise at least one of an external system, a program system, and an administrative system.

28. The method as recited in claim 27, further dynamically updating the user interface, the application database, and the baseline data schema.

29. The method as recited in claim 27, further comprising generating and storing self-describing documents comprising data elements, data element contents, data element characteristics, and data interoperability rules.

30. The method as recited in claim 29, further comprising hosting the self-describing documents at one or more of a proprietary owner host site, a public host site, and an implementing organization host site comprising predetermined security restrictions.

31. The method as recited in claim 27, further comprising mapping the application systems to the baseline data schema and facilitating transmission and messaging between the baseline data schema and the application systems.

32. A method, comprising:
dynamically generating an application database, a reporting database, a web based user interface, and a baseline data schema from self-describing documents in a data source comprising data elements, data element contents, data element characteristics, and data interoperability rules;
enabling interoperability among the application systems; and
providing access to the application systems via the user interface using the application database and the reporting database, wherein the application systems comprise at least one of an external system, a program system, and an administrative system and the application database provides a user with read/write access to the application systems.

33. The method as recited in claim 32, further comprising hosting the self-describing documents at one or more of a proprietary owner host site, a public host site, and an implementing organization host site comprising predetermined security restrictions.

34. The method as recited in claim 32, further comprising mapping the application systems to the baseline data schema and facilitating transmission and messaging between the baseline data schema and the application systems.

35. The method as recited in claim 32, further comprising:
generating the baseline data schema from at least one of a data source and a supplemental data source; and
receiving at least one data element component from the self-describing documents of the supplemental data source overriding defining characteristics of the at least one data element component in the data source.

36. A method, comprising:
dynamically generating an application database, a reporting database, a web based user interface in a computer communications network, and a baseline data schema from self-describing documents in a data source comprising data elements, data element contents, data element characteristics, and data interoperability rules;
enabling interoperability among the application systems, wherein the baseline data schema is a common denominator data structure among the application systems, and the application systems comprise at least one of an external system, a program system, and an administrative system;
mapping the application systems to the baseline data schema and facilitating transmission and messaging between the baseline data schema and the application systems; and
providing access to the application systems via the user interface using the application database and the reporting database, wherein the application database provides a user with read/write access to the application systems.

37. The method as recited in claim 36, further comprising hosting the self-describing documents at one or more of a proprietary owner host site, a public host site, and an implementing organization host site comprising predetermined security restrictions.

38. A method, comprising:
dynamically generating and updating an application database, a reporting database, a web-based portal in a computer communications network, and a baseline data schema from self-describing documents in a data source comprising data elements, data element contents, data element characteristics, and data interoperability rules necessary to facilitate communication and messaging among application systems;
enabling interoperability among application systems using the baseline data schema;
providing access to the application systems providing via the user interface using the application database and the reporting database, wherein the application database provides a user with read/write access to the application systems;
hosting the self-describing hosting the self-describing documents at one or more of a proprietary owner host site, a public host site, and an implementing organization host site; and mapping the application systems to the baseline data schema and facilitating transmission and messaging between the baseline data schema and the application systems, wherein the application systems comprise at least one of federal administrative, programmatic, and external systems.

39. A computer readable storage medium controlling a computer and comprising a process of dynamically generating a web based user interface, providing access to application systems, and a baseline data schema; and enabling interoperability among the application systems, wherein the baseline data schema is a common denominator data structure among the application systems, and the application systems comprise at least one of an external system, a program system, and an administrative system.

40. The computer readable storage medium as recited in claim 39, further comprising dynamically generating an application database.

41. The computer readable storage medium as recited in claim 39, further comprising dynamically generating a reporting database.

42. The computer readable storage medium as recited in claim 39, further comprising mapping the application systems to the baseline data schema and facilitating transmission and messaging between the baseline data schema and the application systems.

43. A computer readable storage medium controlling a computer and comprising a process of dynamically generating a web based user interface, an application database, and a baseline data schema; enabling interoperability among application systems using the baseline data schema; and providing access to the application systems via the user interface using the application database, wherein the baseline data schema is a common denominator data structure among the application systems, and the application systems comprise at least one of an external system, a program system, and an administrative system.

44. The computer readable storage medium as recited in claim 43, further comprising dynamically updating the user interface, the application database, and the baseline data schema.

45. The computer readable storage medium as recited in claim 43, further comprising generating and storing self-describing documents comprising data elements, data element contents, data element characteristics, and data interoperability rules.

46. The computer readable storage medium as recited in claim 45, further comprising hosting the self-describing documents at one or more of a proprietary owner host site, a public host site, and an implementing organization host site comprising predetermined security restrictions.

47. The computer readable storage medium as recited in claim 43, further comprising mapping the application systems to the baseline data schema and facilitating transmission and messaging between the baseline data schema and the application systems.

48. A computer readable storage medium controlling a computer and comprising a process of dynamically generating an application database, a reporting database, a web based user interface, and a baseline data schema from self-describing documents in a data source comprising data elements, data element contents, data element characteristics, and data interoperability rules; enabling interoperability among the application systems; and providing access to the application systems via the user interface using the application database and the reporting database, wherein the application systems comprise at least one of an external system, a program system, and an administrative system and the application database provides a user with read/write access to the application systems.

49. The computer readable storage medium as recited in claim 48, further comprising hosting the self-describing documents at one or more of a proprietary owner host site, a public host site, and an implementing organization host site comprising predetermined security restrictions.

50. The computer readable storage medium as recited in claim 48, further comprising mapping the application systems to the baseline data schema and facilitating transmission and messaging between the baseline data schema and the application systems.

51. A computer readable storage medium controlling a computer and comprising a process of dynamically generating an application database, a reporting database, a web based user interface in a computer communications network, and a baseline data schema from self-describing documents in a data source comprising data elements, data element contents, data element characteristics, and data interoperability rules; enabling interoperability among the application systems, wherein the baseline data schema is a common denominator data structure among the application systems, and the application systems comprise at least one of an external system, a program system, and an administrative system; mapping the application systems to the baseline data schema and facilitating transmission and messaging between the baseline data schema and the application systems; and providing access to the application systems via the user interface using the application database and the reporting database, wherein the application database provides a user with read/write access to the application systems.

52. The computer readable storage medium as recited in claim 51, further comprising hosting the self-describing documents at one or more of a proprietary owner host site, a public host site, and an implementing organization host site comprising predetermined security restrictions.

* * * * *

UNITED STATES PATENT AND TRADEMARK OFFICE
CERTIFICATE OF CORRECTION

PATENT NO.    : 6,754,672 B1
DATED         : June 22, 2004
INVENTOR(S)   : Andrew W. McLauchlin It is certified that error appears in the above-identified patent and that said Letters Patent is hereby corrected as shown below:

Title page,
Item [*] Notice, change "bydays.days" to -- by 272 days --.

Column 2,
Line 50, change "Which" to -- While --.

Column 4,
Line 62, change "score" to -- core --.

Column 5,
Line 11, change "Tules" to -- rules --.

Column 8,
Line 14, change "if" to -- If --.

Column 13,
Line 24, change "Program" to -- program --.

Signed and Sealed this

Nineteenth Day of October, 2004

JON W. DUDAS
*Director of the United States Patent and Trademark Office*